Patented Feb. 23, 1932

1,846,143

UNITED STATES PATENT OFFICE

OLIVER W. RICE, OF REDLANDS, CALIFORNIA, ASSIGNOR TO BROGDEX COMPANY, OF LOS ANGELES, CALIFORNIA, A CORPORATION OF FLORIDA

METHOD OF ARTIFICIALLY COLORING FRUIT

No Drawing.  Application filed August 14, 1929.  Serial No. 385,965.

This invention relates to methods of artificially coloring fruit; and it has to do more particularly with a method or process wherein citrus fruit, of which the rind is at least partially green in color and in that respect objectionable from the standpoint of marketability, is provided with a very thin film-like coating of a protective material adapted to reduce evaporation of the fruit juices through the skin and thereby to check withering or wilting, without at the same time unduly suppressing the breathing of the fruit, and is then subjected to the action of a coloring gas for a sufficient period of time to effect a desired degree of coloring.

It is a fact, well known to those engaged in growing, packing and marketing citrus fruits, such as oranges and lemons, that it is necessary at times to "gas" or "sweat" the fruit in order to bring out the desired orange or yellow color, as the case may be, of fruit which is properly matured and of excellent eating quality, but which because of its variety, the local conditions attending its growth, the season of the year, or for some other legitimate reason, shows more or less green on its surface and therefore is less easily salable than as though its normal color of ripeness had developed fully. Various ways of artificially coloring such fruit, or "pre-coloring" it as is sometimes said, are known and have been practiced in the art heretofore. They all involve subjecting the fruit to the action of a coloring gas, which may comprise, for example, products of incomplete combustion of kerosene, exhaust fumes from an internal combustion engine, or, in more modern practice, ethylene gas highly diluted with air. Generally the gassing is conducted at temperatures above atmospheric, and the fruit has to be held in the gassing "tents" or other appropriate treating rooms for from 4 to 15 days, depending upon the nature of the coloring gas used, the temperature and humidity prevailing in the treating rooms, the character of the fruit, and other practical conditions. Further details of these methods need not be given here because they are well known and understood in the art, and also because, in and of themselves, such details form no part of the present invention.

Gassing or sweating fruit to color it as heretofore practiced, even where the operation takes only 4 or 5 days, is very hard on the fruit. It shrinks or withers considerably and become more or less soft and flabby due to loss of the fruit juices by evaporation through the skin, the "buttons" or stem-stubs drop off, and the general condition of the fruit at the end of the treatment is usually such as to class the fruit as "weak". In this condition it is very sensitive to injury and susceptible to infection by blue mold spores, for example, not to mention the fact that the favorable conditions for decay development during the "sweating" have already often resulted in serious decay of the fruit. As a rule, therefore, pre-colored fruit is notoriously difficult to ship to distant markets without danger of incurring heavy decay losses. Furthermore, pre-colored fruit commonly has a characteristically dull or "dead" and pale appearance in contrast with the bright natural color of normal fruit. These and other objections to the pre-coloring of fruit as heretofore practiced have long been recognized but regarded as unavoidable.

I have found that these objections can be wholly or largely overcome in a relatively simple and economical manner by following a procedure which includes essentially, as a step antecedent to gassing or sweating the fruit, the provision upon the surface of the fruit of a very thin film coating of suitable protective material, most desirably waxy material, so applied and of such character as materially to impede the passage of moisture and gases through the rind, but not to such an extent as to prevent or too greatly cut down the breathing or transpiration so essential to the continued well-being of the fruit. Contrary to what would naturally be expected, application of this protective coating when properly accomplished does not interefere with the desired coloring action of the ethylene or other coloring gas contained in the atmosphere with which the oranges, for example, are thereafter bathed in the gas or coloring room. On the contrary the coloring action proceeds well and continues to go on to some extent even after the fruit is removed from the gas room; so that fruit removed from the gas room still showing a slight green tinge will usually develop its full color in, say 4 to 5 days thereafter. Moreover, the fruit, instead of withering and getting soft in the gas room, remains plump and firm, retains its buttons to a much greater extent, develops a rich natural color, and in general has a live and attractive appearance noticeably distinguishing it from pre-colored fruit of the prior art. Its holding or keeping qualities are also far superior. In using a waxy coating material in the practice of the invention, it is advisable, for best results, not to employ an oil solvent or vehicle associated therewith, but to apply the wax or wax mixture alone in a sufficiently molten or fluid condition to spread easily into a continuous film coating all over the fruit.

In its most effective and desirable practical embodiment, the new method includes also applying to the surface of the fruit initially, before spreading the waxy film coating thereover, an alkaline agent. Experience with the new method shows that the presence of such alkaline agent favorably influences the coloring reaction in a manner not clearly understood but plainly observable. In addition, if the alkaline agent used be highly effective as a mold retardant, it affords the additional advantage of protection against decay. Borax is an alkaline agent especially well suited for use in practicing the invention. It is also feasible to use strong alkalies, such as sodium hydroxide or sodium carbonate, under properly controlled conditions of operation.

By way of further illustrating and explaining the underlying principles of the invention, one particularly desirable way in which it may be carried out in practice for pre-coloring oranges will now be described in some detail, although it will be understood that the invention in its broader aspects is not to be regarded as restricted to such detail.

In this typical example, the oranges which are to be artificially colored are first passed through a warm alkaline water solution containing, for example, around 6 to 8 ounces of borax per gallon. The oranges are thoroughly soaked in and wetted with this solution for a substantial period of time, say from 5 to 10 minutes, during which they may also desirably be rubbed or scrubbed with the warm solution in order both to cleanse the surface of the fruit from foreign matter and also to ensure effective impregnation of all surface porosities and exposed rind tissues. In this way, not only is the fruit prepared to withstand successfully the tendency to decay development during the subsequent gassing or sweating treatment and while it is later in transit to market, but furthermore the surface of the fruit is so cleansed and otherwise prepared by the action of the alkaline solution that access of the coloring gas at a later stage of the treatment to the surface cells of the rind is facilitated, notwithstanding the fact that waxy protective material is applied to the fruit prior to treatment with the coloring gas. As further illustrating in a general way how this initial step of treating the fruit with borax solution may be carried out, reference is made to Patent 1,529,461 Brogden & Trowbridge, March 10, 1925.

Following the initial treatment with an alkaline agent as described, the fruit is next most desirably run through a drier to remove sensible surface moisture, passage through the drier being optionally preceded by a very light rinsing with plain water to remove unnecessary excess of the alkaline agent. After the oranges have passed through the drier, a minute quantity of protective material, most advantageously a waxy material such as paraffin wax, is next applied to each orange in fluent condition and spread substantially uniformly over the entire surface thereof to provide an extremely thin, continuous, film-like protective coating effective to retard or check wilting of the fruit without, however, sealing the fruit to such an extent that transpiration or breathing of the fruit is unduly interfered with. An excellent way to provide such a coating is to spray or atomize upon each orange a small quantity of molten paraffin wax unaccompanied by admixed oil or other solvent vehicle, and then to vigorously rub the fruit in a heated environment until the wax is distributed over the entire surface of the fruit to form the desired film coating of the character just mentioned. One type of apparatus and general mode of procedure by which this result can be accomplished is described in the patent to Brogden 1,641,112, Aug. 30, 1927, but it is to be understood, of course, that other specific forms of apparatus and procedure may be used. A particular advantage of using the general procedure described in the Brogden patent just mentioned is that the oranges can thus be conveniently exposed to a mist or fog of paraffin wax, in addition to the initial direct application to the fruit of a jet or spray of molten paraffin, for a desired period of time while the oranges are being vigorously rubbed and brushed by rapidly revolving polisher rolls. It is of advantage to hold the fruit on the polisher rolls for from 10 to 30 seconds, for example, the atmospheric environment immediately adjacent the rolls being heated well above the melting point of the paraffin wax. Temperatures ranging upward from about 140° to 150° F. are desirable in this connection, and considerably higher temperatures may also be employed without injury to the fruit where it is not allowed to remain too long in the heated environment.

Instead of using a relatively low melting waxy material such as ordinary commercial paraffin wax, it has been found that the process of the invention yields especially good results when a waxy material is employed having a substantially higher melting point. By way of example, mixtures of paraffin and carnauba wax, containing up to, say 50 per cent carnauba wax with melting points ranging from 170° to 180° F., have been found very effective, especially when the fruit is held on the polisher brushes from 10 to 30 seconds in an environment heated to around 200° to 220° F. In practice it is found desirable to apply the molten wax mixture to the fruit in quantity equal to around 9 to 12 pounds per car of 462 standard boxes; but of course the invention is not restricted to such specific quantity.

Providing the oranges with a protective coating of the character resulting from the described treatment, and particularly where a mixture of paraffin and carnauba waxes is used, has a highly beneficial effect in the succeeding step of subjecting the coated fruit to the action of a coloring gas.

In the next step of the complete method, the oranges, provided with a film-like protective coating as hereinabove described, are introduced into the coloring room and are there held for the requisite period of time in contact with the coloring gas which, in the present illustrative example, may advantageously be ethylene gas diluted with a large volume of air in the known manner. Here the fruit remains until the desired degree of color development has taken place. Usually this is a matter of at least 2 or 3 days, and a part of the fruit thus treated may require a considerably longer period of contact with the coloring gas to effect the desired result. After this treatment with the coloring gas, the fruit is ready to be packed and shipped to market in the usual manner.

By proceeding in the manner hereinabove described, there is an actual saving to the grower or shipper of a very substantial volume of fruit which was heretofore absolutely lost to them through the wilting or shrinking of the fruit during the period it was held in the coloring room. In the case of navel oranges grown and packed in the northern orange growing sections of California, of which it is always necessary to pre-color a large proportion in order to render the fruit acceptable in metropolitan markets, this actual saving to the grower or shipper, brought about by the present process, amounts conservatively to from about 3 per cent to 5 per cent of the volume of fruit subjected to pre-coloring treatment. In the case of Southern California Valencias, this saving is still greater, amounting to from 8 per cent to 12 per cent. This is apart from and in addition to the fact that, when the method of the present invention is employed, the resultant pre-colored fruit is in far better condition and is much superior in general appearance, especially in richness of color, as compared to fruit pre-colored in accordance with prior practice. This means materially increased returns to growers and shippers.

While inclusion of the alkaline treatment of the fruit as an initial step of the complete process has important practical advantages as hereinabove pointed out, it is to be understood that it is not indispensable for the successful practice of the invention in its broader aspects, and the invention is not restricted to a procedure involving it.

What is claimed is:

1. The method of artificially coloring citrus fruit of which the rind is at least partially green in color, which comprises spreading over the surface of the fruit a thin coating of protective material effective to reduce materially evaporation of the fruit juices while permitting the fruit to breathe, and subjecting the coated fruit to the action of a coloring gas until coloring is effected to the desired degree.

2. The method of artificially coloring citrus fruit of which the rind is at least partially green in color, which comprises spreading over the surface of the fruit a thin coating of protective material effective to reduce materially evaporation of the fruit juices while permitting the fruit to breathe, and subjecting the coated fruit to the action of ethylene gas until coloring is effected to the desired degree.

3. The method of artificially coloring citrus fruit of which the rind is at least partially green in color, which comprises spreading over the surface of the fruit a thin coating of waxy material effective to reduce materially evaporation of the fruit juices while permitting the fruit to breathe, and subjecting the coated fruit to the action of a coloring gas until coloring is effected to the desired degree.

4. The method of artificially coloring citrus fruit of which the rind is at least partially green in color, which comprises spreading over the surface of the fruit a thin coating of waxy material effective to reduce materially evaporation of the fruit juices while permitting the fruit to breathe, and subjecting the fruit to the action of ethylene gas until coloring is effected to the desired degree.

5. The method as defined in claim 3, in which the waxy material is substantially free of admixed oil.

6. The method as defined in claim 4, in which the waxy material is substantially free of admixed oil.

7. The method of artificially coloring citrus fruit of which the rind is at least partially green in color, which comprises spreading over the surface of the fruit with the aid of heat a thin coating of waxy material comprising a component having a higher melting point than paraffin wax, the thickness of said coating being sufficient to reduce withering while permitting the fruit to breathe, and subjecting the coated fruit to the action of a coloring gas.

8. The method of artificially coloring citrus fruit of which the rind is at least partially green in color, which comprises spreading over the surface of the fruit with the aid of heat a thin coating of waxy material comprising a mixture of paraffin and carnauba waxes, the thickness of said coating being sufficient to reduce withering while permitting the fruit to breathe, and subjecting the coated fruit to the action of a coloring gas.

9. The method of artificially coloring citrus fruit of which the rind is at least partially green in color, which comprises spreading over the surface of the fruit with the aid of heat a thin coating of waxy material comprising a mixture of paraffin and carnauba waxes, the thickness of said coating being sufficient to reduce withering while permitting the fruit to breathe, and subjecting the coated fruit to the action of ethylene gas.

10. The method of artificially coloring citrus fruit of which the rind is at least partially green in color, which comprises applying an alkaline agent to the surface of the fruit, spreading thereover a thin coating of protective material effective to reduce withering while permitting the fruit to breathe, and subjecting the coated fruit to the action of a coloring gas until coloring is effected to the desired degree.

11. The method of artificially coloring citrus fruit of which the rind is at least partially green in color, which comprises applying an alkaline mold-retardant to the surface of the fruit, spreading thereover a thin coating of waxy material effective to reduce withering while permitting the fruit to breathe, and subjecting the coated fruit to the action of a coloring gas until coloring is effected to the desired degree.

12. The method of artificially coloring citrus fruit of which the rind is at least partially green in color, which comprises applying an alkaline borate to the surface of the fruit, spreading thereover with the aid of heat a thin coating of a mixture of paraffin and carnauba waxes effective to reduce withering while permitting the fruit to breathe, and subjecting the coated fruit to the action of ethylene gas.

In testimony whereof I hereunto affix my signature.

OLIVER W. RICE.